May 18, 1965 R. D. BUCK 3,184,741
SELECTIVE DATA TRANSFER SYSTEM
Filed March 17, 1960 3 Sheets-Sheet 1

INVENTOR
ROBERT D. BUCK
BY Edgar H. Kent
ATTORNEY

United States Patent Office 3,184,741
Patented May 18, 1965

3,184,741
SELECTIVE DATA TRANSFER SYSTEM
Robert D. Buck, Saugerties, N.Y., assignor to International Business Machines Corporation, New York, N.Y., a corporation of New York
Filed Mar. 17, 1960, Ser. No. 15,763
8 Claims. (Cl. 343—17.1)

This invention relates generally to binary data processing, and in particular it is concerned with a system of selecting the best data from a radar system and preparing the data for an electronic digital computer adapted to assimilate it.

A system of aircraft surveillance has been proposed in which radar signals of three different types are transmitted successively. The first signal to occur in each related group of three such signals has a fixed frequency; the second exhibits a linear decrease in frequency, and the third a linear increase. Accordingly, when a target echo is received, its frequency characteristics will be dependent upon the nature of the signal transmitted. In response to the first signal in any group, the frequency of a target echo will very nearly correspond to the frequency of the transmitted signal itself except for the amount of Doppler frequency shift that the target introduces. In response to each of the variable frequency signals, however, the target echo frequency will include an increment which is also dependent upon the range of the target. To make use of this fact, each echo from a variable frequency signal is combined in a receiver with a local oscillator signal exhibiting the same kind of frequency variation as the transmitted signal. A very nearly fixed intermediate frequency (IF) results. By comparison of such IF signals with similar IF signals derived from fixed frequency echoes, an indication of the range of the target alone can be obtained.

This comparison can be performed very rapidly in an electronic digital computer if the IF signals are quantized. To quantize the signals, it has been proposed to apply them to a bank of crystal filters having contiguous passbands which cover the range of frequencies necessary to specify all detectable targets. The filters are sensed successively and the ones that are excited are identified by count. That is, a count of the sensing operations is maintained and read out each time an energized filter is detected.

A problem has arisen in this connection because of the fact that often not one but several filters are energized by a single target echo, creating an ambiguity. The reason is that the position of the target is changing, or the same effect is also produced by a very strong target echo. Accordingly it has been proposed to combine each target echo from a variable frequency signal with a number of local oscillator signals having slightly different rates of change, and to apply the resulting IF signals to separate filter banks. From a visual inspection and comparison of the pattern of excitations found in the several filter banks, more accurate indications of targets could be deduced. This would be a very tedious and time-consuming process, not well suited to use with modern high speed data processing equipment. Also, it would be too slow to provide useful information regarding the positions of aircraft or missiles traveling at high speeds.

Accordingly, the object of the present invention is automatically to transfer to a computer only the most accurate and reliable indications of targets obtained from a plurality of these filter banks.

A further object is to perform the above-mentioned selective transfer of data without recourse to information regarding the relative levels of excitation of the individual filters.

A still further object is to perform the above-mentioned selective transfer of data with a minimum of equipment.

In brief, there are provided according to the present invention a plurality of counting circuits, each adapted to count incoming signals that are presented in serial form on a corresponding input line from filters that are excited in clusters in a corresponding filter bank, that is, the signals occur successively in timed relation to one another and indicate by their presence or absence whether filters that are sensed in corresponding succession are excited or not. Associated with the respective counting circuits are circuits for reading out selected counts according to predetermined criteria. Thus, when counts in two or more counters are completed at the same time, preference is given to the last count to begin and the other completed counts are disregarded. When a count is the first to be completed, it is selected in preference to all others which began no later, these others being disregarded. Under any other conditions, each count is read out as it ends.

The novel features of the invention together with further objects and advantages will become apparent from the following detailed description and the drawing to which it refers.

Figure 1:
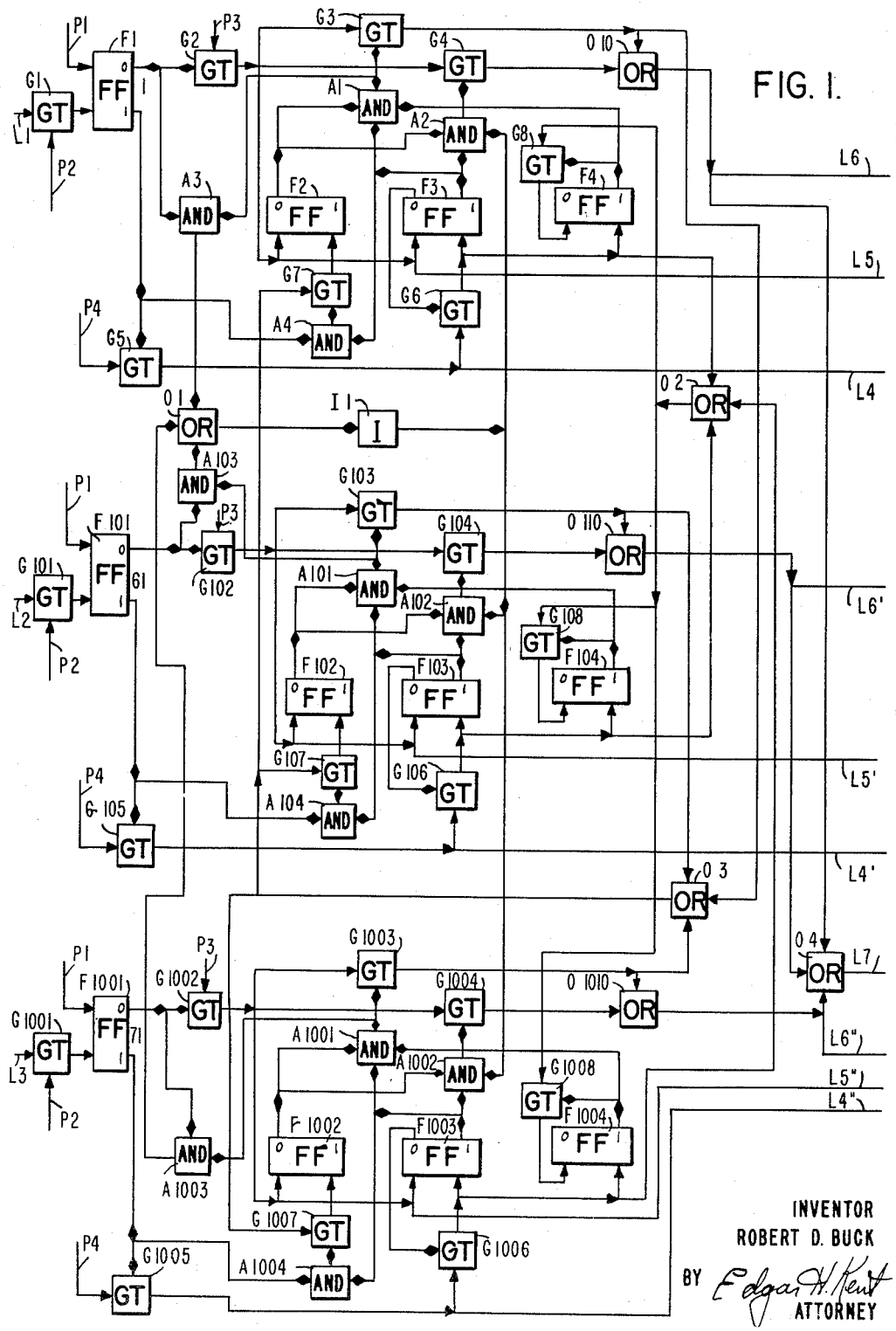
FIG. 1 is a logical block diagram of the circuits for selecting counts of incoming signals in accordance with the invention.
Figure 2:
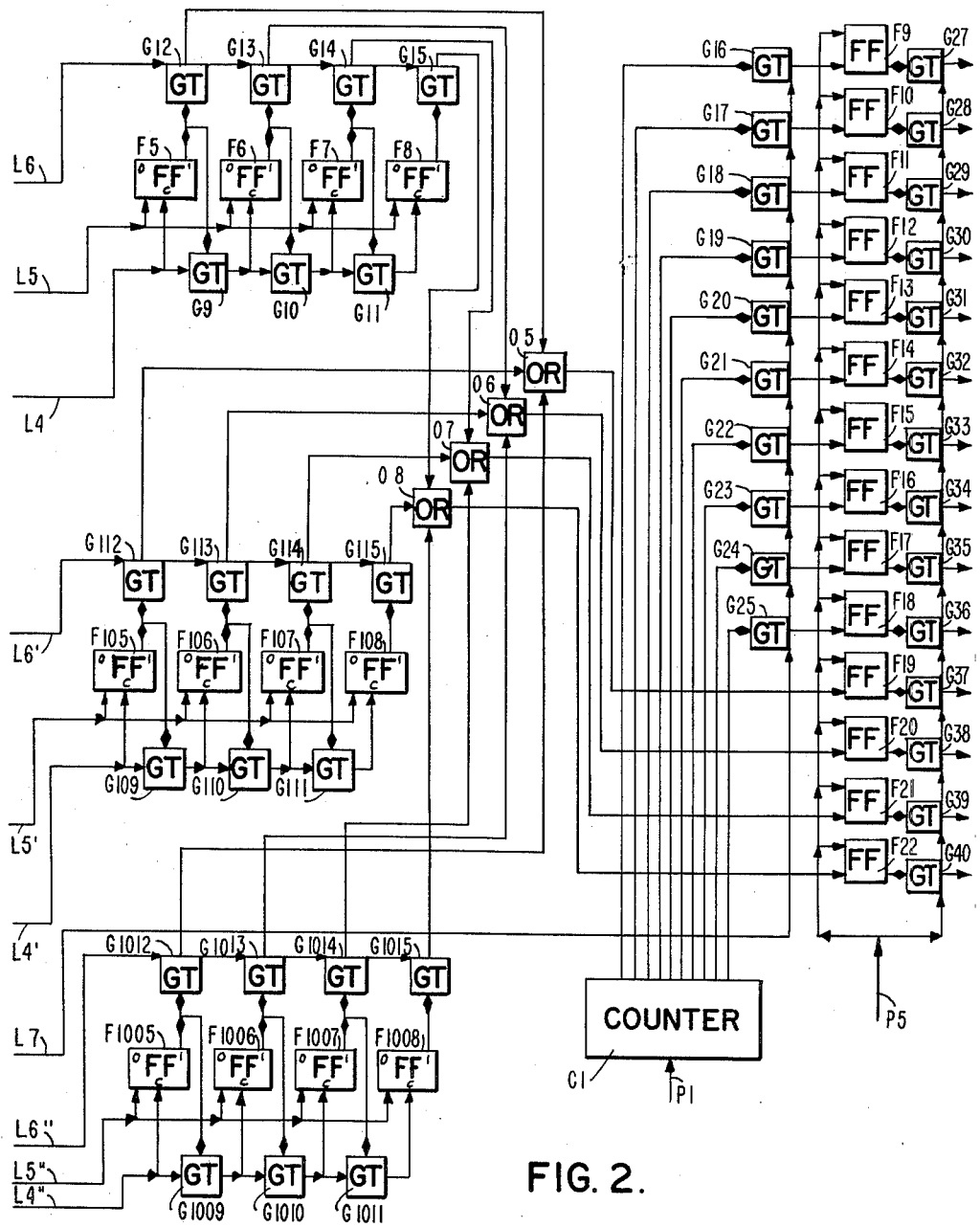
FIG. 2 is a logical block diagram of the circuits for counting the signals and for identifying them.

With reference first to FIGS. 1 and 2 it will be observed that the circuitry has been illustrated in connection with three input lines L1–L3 providing signals indicative of the excitation patterns of three different filter banks. Each of these lines serves a corresponding one of a group of three selection circuits which are interrelated by OR devices O1–O8 and an inverter I1. Since the three selection circuits are identical, only one of them will be described in detail.

Accordingly, there is connected to line L1 a gate G1 which passes signals to the ONE input of a flip-flop F1 in synchronism with timing pulses P2. Connected to the ZERO input of the flip-flop is a source of timing pulses P1. The ONE output of flip-flop F1 conditions a gate G5 which is sensed by timing pulses P4, while the ZERO output conditions a gate G2 which is sensed by timing pulses P3. The output of gate G2 is connected to a pair of gates G3 and G4 as well as to the ZERO inputs of a pair of flip-flops F2 and F3. The ZERO output of the flip-flop F2 is applied to an AND device A1 whose output conditions the gate G3. The remaining inputs to AND device A1 are obtained from the ONE outputs of flip-flop F3 and another flip-flop F4. The ZERO output of flip-flop F3 conditions a gate G6. Gate G6 is sensed by output pulses from gate G5 and has its own output connected to the ONE inputs of flip-flops F3 and F4. The ZERO input of flip-flop F4 is derived from a gate G8 which is conditioned by the ONE output of flip-flop F4 itself.

To complete the circuit there is provided a two input AND device A4 which has as one of its inputs the ONE output from flip-flop F1, and as the other input, the ONE output from flip-flop F3. AND device A4 serves to condition a gate G7 which controls the ONE input to flip-flop F2. Also there are provided an AND device A3 and an OR device O10. AND device A3 has as its inputs the ZERO output of flip-flop F1 and the output of AND device A1. OR device O10 has as its inputs the outputs of gates G3 and G4 and is itself connected as an input to an OR device O4. The remaining connections, it will be observed, involve the other selection circuits.

Thus, the output of gate G6 is combined in an OR device O2 with the outputs from the corresponding gates in the other circuits (G106 and G1006), the output of OR device O2 being applied to gate G8 and its counterparts. Similarly, the output of gate G3 is combined in an OR circuit O3 with the outputs from the corresponding gates in the other circuits (G103 and G1003), the output of OR device O3 being used to condition gate G7 and its counterparts. Finally, the outputs of the corresponding AND devices A3, A103 and A1003 are combined in an OR device O1 whose output is applied to an inverter I1. The output of the inverter is applied to AND device A2 and its counterparts.

With reference now to FIG. 2, it will be observed that there are three identical counting circuits responsive to the respective selection circuits described in detail in connection with FIG. 1. Included in a first of these counting circuits are flip-flops F5–F8 which are read out by means of gates G12–G15. Signals representing counts are derived from gate G5 in FIG. 1 by way of a line L4 and are applied to the complementing input of the flip-flop F5. In addition to gate G12, the ONE output of flip-flop F5 condititons a gate G9 which, in turn, has its output side connected to the complementing input of flip-flop F6. The ONE output of flip-flop F6 conditions a gate G13 as well as G10 which has its output side connected to the complementing input of flip-flop F7. In like manner, a gate G11 is used to control the state of flip-flop F8. Flip-flops F5–F8 are re-set by pulses transmitted by way of a line L5 from G2 in FIG. 1.

Gates G12–G15 which serve to read out the count in the flip-flops are sensed by pulses transmitted on a line L6 from OR device O10 in FIG. 1. The output sides of the gates G12–G15 are combined with their counterparts in the other counting circuits in OR devices O5–O8. Thus, as shown, OR circuit O5 combines the output sides of gates G12, G112 and G1012; OR circuit O6 combines the output sides of gates G13, G113 and G1013 and so forth. To the right of FIG. 2 there is shown a line of flip-flops F9–F22. These are adapted to serve as storage for signals representing a selected count read out of flip-flops F5–F8 and signals identifying the source responsible for the digit at the end of the count, that is, the individual excited filter which gave rise to the last digit in the count. To this end, flip-flops F19–F22 have their ONE sides connected to the respective outputs of OR devices O5–O8, and flip-flops F9–F18 have their ONE sides connected to the output sides of gates G16–G25, respectively. These gates in turn are supplied with sensing pulses on a line L7 from OR device O4 in FIG. 1 and are conditioned by the respective outputs from a counter C1. Counter C1 may, and preferably will, take the same form as the counting circuits just described, except of course it must be adapted to count higher numbers. In particular, what it counts is timing pulses P1 which occur just before the incoming signals representing excited filters and which, together with pulses P2–P5, can be obtained in any number of ways well known to those skilled in the art. To read out the contents of the flip-flops F9–F22, there are provided gates G27–G40 which are sensed by timing pulses P5. The latter also serve to re-set the flip-flops, as shown.

The circuitry as described is designed to count signals resulting from successive excited filters in each of the filter banks. The count for each bank ends as soon as a non-excited filter is sensed. The count is read out when it ends unless another count ends at the same time but began later or unless another count that began no earlier than the others has ended, in which case the first-mentioned count is disregarded.

The operation of the system according to the present invention will be described with reference first to FIG. 1, where the selection circuits for establishing priorities of counts are illustrated. In brief, flip-flop F1 and its counterparts serve to record the presence of incoming signals representing filters that are excited. Flip-flop F1 is reset by P1 pulses which occur at the beginning of each interval that a filter is sensed. Flip-flop F2 and its counterparts prevent the read out of a count of a cluster of filter signals when set as a consequence of the read out of another related count. Flip-flop F3 and its counterparts indicate that a count is in progress, and flip-flop F4 indicates whether any count has begun more recently than another.

Figure 3:
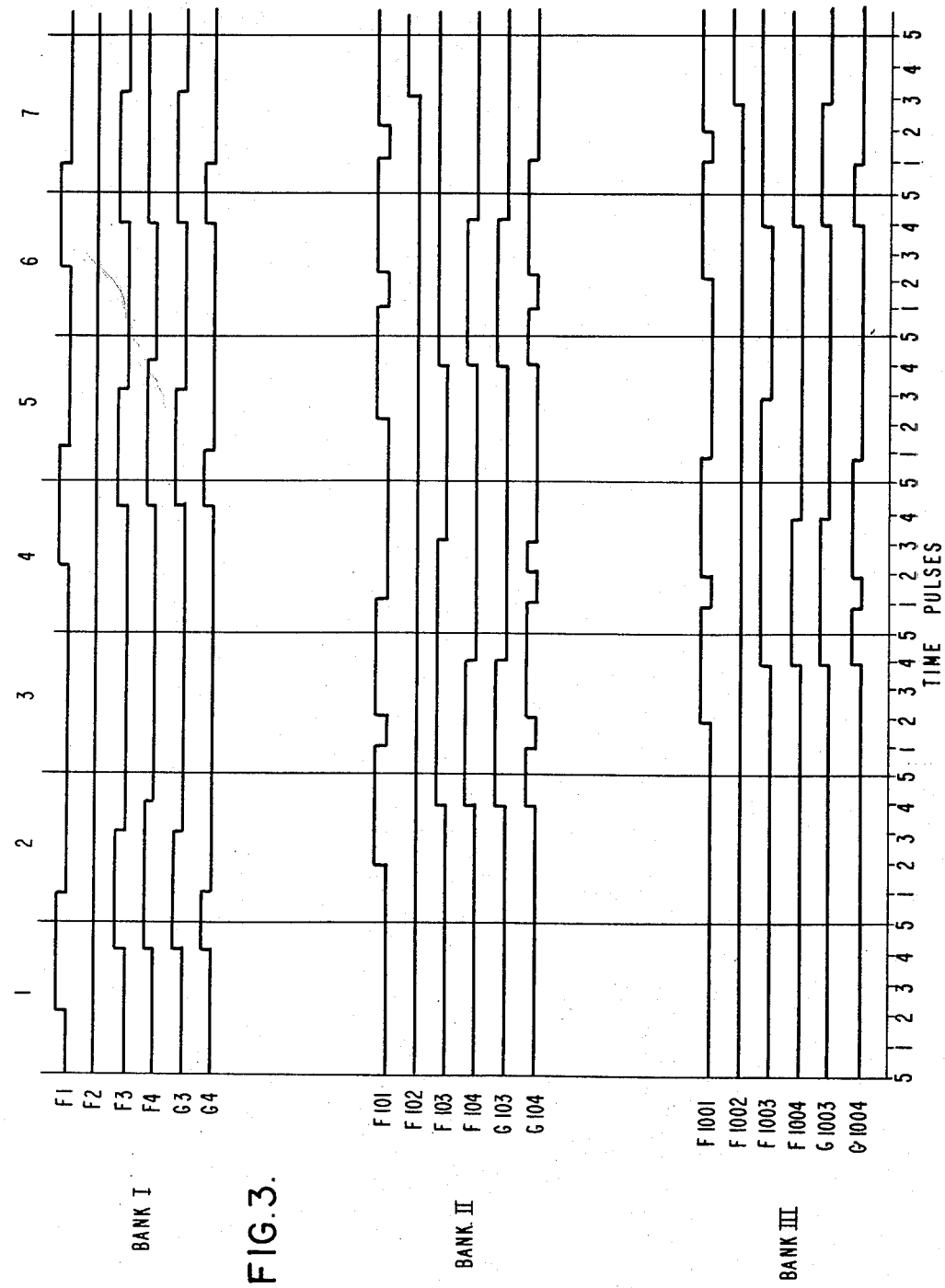
FIG. 3 is a timing diagram to illustrate the operation of the circuitry according to the invention.

To illustrate in detail the interaction of the selection circuits illustrated in FIG. 1, there is shown in FIG. 3 a timing diagram indicative of the states of flip-flops F1–F4, gates G3–G4, and their counterparts at various times. The pattern of incoming signals from individual filter banks corresponds to the sequence of filters that are found to be excited when the filters are sensed successively. Flip-flops F1, F101 and F1001 indicate this by their states because these flip-flops are set directly by the presence of incoming signals on corresponding lines L1–L3. The time axis is shown in terms of time pulses P1–P5 which occur once during each sensing interval. Although for clarity in the diagram, these pulses have been shown to be uniformly spaced it should be understood that they need not and preferably will not be so spaced. Also in the diagram a positive going indication connotes that a flip-flop is in a ONE state or that a gate is open to the transmission of a pulse. All flip-flops will be assumed to be in the ZERO state to being with.

Thus the first signal to evidence that a filter is excited appears at flip-flop F1 setting it to ONE at P2 time. Flip-flops F101 and F1001 remain in their ZERO states in the absence of contemporaneous signals from the other filter banks. Accordingly, pulse P3 passes gates G102 and G1002 and tending to re-set flip-flops F102, F103, F1002 and F1003 which, however, are in the ZERO state. This pulse also samples gates G103, G104, G1003 and G1004 which are not conditioned, however, because flip-flops F103, F104, F1003 and F1004, together with all the other flip-flops, are assumed to be in the ZERO state at the start of the operation. Pulse P4 will be blocked in the second and third circuits but it will pass through gates G5 and G6 of the first circuit to set flip-flops F3 and F4. Pulse P4 will also pass through OR device O2 to sample gate G8 and its counterparts in all three circuits. Gate G8 does not pass the pulse, however, because the state of flip-flop F4, although in the process of being changed to ONE, is not yet effective to condition the gate at this time. The net result, therefore, is that flip-flop F4 ultimately assumes a ONE state and flip-flops F104 and F1004 remain at ZERO. Finally it will be observed that pulse P4 is transmitted by way of line L4 to register a count in the counter associated with the first circuit. Pulse P5 is as yet ineffective because the buffer register comprising flip-flops F9–F22 in FIG. 2 is still empty.

At the beginning of the next filter sensing interval, pulse P1 re-sets flip-flop F1 opening gate G2, and enabling AND device A3. In consequence, AND device A3 supplies an output to OR device O1, causing the inverter I1 to remove an input signal from AND device A2 and its counterparts in all three of the circuits. The next pulse to occur in the second interval, pulse P2, samples gate G101 and, finding the gate conditioned, sets flip-flop F101 to ONE. In consequence, gate G105 is conditioned and AND device A104 is supplied with an input signal. Pulse P3 is blocked by gate G102 in the second circuit and is blocked by gates G1003 and G1004 in the third circuit. In the first circuit, however, pulse P3 is passed through gates G2, G3 and OR device O10. As will be observed from FIG. 2, the result is that gates G12–G15 of the corresponding counting circuit are sampled and the count (one in this case) is transferred through OR devices O5–O8 to flip-flops F19–F22. After it passes OR device O4, pulse P3 also samples gates G16–G25 in order to transfer to flip-flops F9–F18 the contents of the counter C1 which identify in terms of a binary number the filter responsible for the incoming signal during the first interval. In the illustrated example, this number may be regarded as two, one more than the number of the first sensing interval, assuming of course that it was the first filter in the bank that was sensed during the first interval illustrated. Finally from gate G2, pulse P3 resets flip-flops F2 and F3 as well as F5–F8. Pulse P4 is passed by gate G105 with the result that a count is registered in its corresponding counting circuit in FIG. 2 comprising flip-flops F105–F108. Pulse P4 also sets to ONE flip-flops F103 and F104, whereby gates G103, G104 and G108 are opened and gate G106 is closed. Before it is closed, however, gate G106 passes the pulse by way of OR device O2 to sample gate G108. The pulse does not pass gate G108, however, because it too is not opened right away. Accordingly, flip-flop F104 when set to ONE remains at ONE. At this point, the information in the buffer register is ready to be read out to some form of utilization device such as a computer. As shown, this is accomplished on signal from pulse P5 which samples the gates G27–G40 and also serves to re-set the flip-flops F9–F22 comprising the buffer register.

In the third interval for the receipt of incoming signals, pulse P1 re-sets flip-flop F101 and since AND device A101 is enabled, so also is AND device A103 enabled. By virtue of the action of the inverter, this disables AND device A102 AND devices A2 and A1002 already being disabled. Pulse P2 is passed by gates G101 and G1001 but not gate G1 as two filter signals appear on lines L2 and L3 of the second and third selection circuits during this interval. Consequently flip-flops F101 and F1001 are set to ONE. Flip-flops F2, F3, F5, F6, F7 and F8, although already in their ZERO states, are re-set to ZERO by pulse P3. Pulse P4 is passed by gates G105 and G1005, thereby causing a count to be recorded in the two counters of FIG. 2 corresponding to the second and third selection circuits. Pulse P4 also passes gate G1006, whereupon it sets to ONE flip-flops F1003 and F1004. It also passes OR device O2 and samples gate G8 and its counterparts in all three selection circuits. In consequence, flip-flop F104 is re-set, since it was in a ONE state. Pulse P5 has no effect since there is now no word in the buffer storage register of FIG. 2 to be transferred.

In the fourth interval, pulse P1 re-sets flip-flops F101, F1001, placing them in the ZERO state as was flip-flop F1 before the interval began. In consequence, AND device A1003 becomes enabled, causing AND devices A2, A102 and A1002 to become disabled and gates G4, G104 and G1004 to become deconditioned. At P2 time, incoming signals during this fourth interval cause flip-flops F1 and F1001 to be set to ONE, which in turn disables AND device A1003, enables AND device A102, and conditions gate G104. In the absence of an incoming signal for the second circuit, pulse P3 passes gates G102, G104 and samples gates G112–G115 of the corresponding counter in FIG. 2 so that the count (2) in the counter is transferred to flip-flops F19–F22. After passing device OR O4, the same pulse samples gates G16–G25, whereby the filter number identifying the second of these counts is entered in the flip-flops F9–F18. Pulse P4 is passed by gates G5, G6 and G1005. In consequence, flip-flops F3 and F4 are set to ONE, and flip-flop F104 is re-set through the action of gate G1008. Gates G5 and G1005 also serve to pass pulse P4 to the counters in FIG. 2 corresponding to the second and third selection circuits. Upon the occurrence of pulse P5, the contents of the buffer register flip-flops F9–F22 in FIG. 2 are read out once again and the flip-flops are re-set.

Pulse P1 of the fifth interval re-sets flip-flops F1 and F1001, flip-flop F101 already being in the ZERO state at the start of the interval. Also AND device A3 is enabled, in consequence of which gates G4 and G1004 are deconditioned, gate G104 already having been deconditioned. When pulse P2 occurs, there is one incoming signal only which sets flip-flop F101. Accordingly, pulse P3 is passed by gates G2 and G1002. Gates G1003 and G1004 are deconditioned, however, blocking the pulse in the third circuit and preventing flip-flops F1012–F1015 of the corresponding counter from being read out. Instead, these flip-flops as well as flip-flops F1002 and F1003 are re-set, effectively destroying the count. Pulse P3 also is effective through G3 to transfer the count (1) from flip-flops F5–F8 comprising the counter for the first circuit together with an identifying number as described in the foregoing. Pulse P4 passes gate G105 of the second circuit, causing a count to be registered in its corresponding counter and causing flip-flops F103 and F104 to be set to ONE. Pulse P5 causes the contents of flip-flops F9–F22 to be read out and the flip-flops to be re-set as before.

In the sixth interval, after the occurrence of the re-setting pulse P1, each of the flip-flops F1, F101 and F1001 is set to ONE by an incoming signal at the time of pulse P2. Consequently, pulse P3 has no effect. Pulse P4, however, sets flip-flops F3, F4, and F1003, F1004 to ONE which causes gates G3, G4 and G1003, G1004 to be conditioned. This pulse is also effective to re-set to ZERO flip-flop F104 which had been set to ONE during the fifth interval, deconditioning gate F103. Pulse P5 has no effect since there is no information in flip-flops F9–F22 of FIG. 2 to be transferred.

In the seventh period, after the flip-flops F1, F101 and F1001 have been re-set by pulse P1, flip-flops F101 and F1001 are then set to ONE by incoming signals at the time of pulse P2. Consequently, pulse P3 is blocked in the second and third selection circuits and passed by gates G2 and G3 in the first circuit. This makes pulse P3 effective to transfer to the flip-flops F9–F22 the contents of the top counter (flip-flops F5–F8) of FIG. 2, which contains a count of ONE, together with the identifying number of the count.

In addition, pulse P3 samples gates G7, G107 and G1007. Since AND devices A104 and A1004 are enabled, flip-flops F102 and F1002 are set to ONE, disabling AND devices A101, A102, A1001 and A1002. In consequence, gates G103, G104, G1003, and G1004 are deconditioned, permanently preventing the read out of counts from the second and third counters that are in progress. Pulse P4 causes the count in the counters for the second and third selection circuits to be increased by one, and pulse P5 causes the contents of flip-flops F9–F22 in FIG. 2 to be read out in the usual manner. Assuming that in the next interval no incoming signals appear at the time of pulse P2, all of the flip-flops will be re-set to their ZERO states and the system will be in condition to perform again in the manner just described or in any other manner as determined by the actual pattern of the incoming signals that follow.

While a preferred embodiment of the invention has been shown and described herein, various modifications thereof will be obvious to those skilled in the art and it will be understood that the invention is not intended to be limited thereto or to details thereof and departures may be made therefrom within the spirit and scope of the invention as defined in the claims.

What is claimed is:

1. An input system for controlling the translation to a data processing apparatus of data messages of variable length applied concurrently on a plurality of input lines comprising
   cyclically operative search means coupled to each said input line to sense the length of the data messages applied on said lines,
   means coupled to each line to store message information,
   means operative in each cycle of said search means to translate to said data processing apparatus message information with respect to any message that has terminated as sensed by said search means, and means responsive to the sensing of the termination of any one message to inhibit future translation of information related to any other message sensed concurrently with said one message by said search means that said search means indicates is longer than said one message at the time of the sensed termination of said one message.

2. An input system as claimed in claim 1 which includes means to provide signals indicative of the source of each of said data messages, and means to translate said source signals to said apparatus.

3. Apparatus as claimed in claim 2 wherein said means to provide source signals includes a source of timing pulses having a repetition rate synchronized with that of the signals in said trains, a counter to provide signals indicative of a count of the pulses from said pulse generator, a plurality of gate circuits, means to apply said counter provided signals to condition said gate circuits, and means to sample said gate circuits to transmit at selected times said signals indicative of the count of said timing pulses.

4. An input system as claimed in claim 1 wherein said translation means includes a plurality of counting circuits to count the signals in each data message, each of said counting circuits being re-set upon termination of data messages being counted.

5. Apparatus as claimed in claim 4 wherein said translation means further includes a plurality of gate circuits, means to apply outputs of said counting circuits to selectively condition said gate circuits, and means to apply sampling signals to said gate circuits to effect the transfer of signals indicative of counts from said counting circuits.

6. An input system for data processing apparatus which comprises means to concurrently provide a plurality of trains of data signals, the signals in each train being indicative of a radar target echo, means to sense the signals in each train, means to provide signals indicative of the source of the trains of signals, transfer means operative on termination of each train as sensed by said sensing means to transfer to said apparatus signals indicative of the content and source of that train of signals, and control means operative upon termination of any one of said trains of signals to prevent the transfer to said apparatus of signals corresponding to any other train sensed by said sensing means concurrently with said one train that said sensing means indicates is already longer than said one train at the time of translation to said apparatus of said content and source signals corresponding to said one train.

7. A data translation control system for controlling in accordance with a pre-established criterion the translation to an output circuit of data messages applied concurrently on a plurality of input lines comprising cyclically operative search means coupled to each said input line to sense the data messages applied on said lines with respect to said pre-established criterion, means to store cumulative cycle information on the operation of said search means, means operative in each cycle of said search means to translate to said output circuit cycle and data information with respect to any message meeting said pre-established criterion as sensed by said search means, and means responsive to the sensing of any one message meeting said pre-established criterion to inhibit future translation of information related to any other message sensed by said search means concurrently with said one message that does not meet said pre-established criterion.

8. A data translation control system for controlling the translation to an output circuit of data messages of variable length applied concurrently on a plurality of input lines comprising cyclically operative search means coupled to each said input line to sense the length of the data messages applied on said lines, means coupled to each line to store message length information as sensed by said search means, means to store cumulative cycle information on the operation of said search means, means operative in each cycle of said search means to translate to said output circuit cumulative cycle and message length information with respect to any message that has terminated as sensed by said search means, and means responsive to the sensing of the termination of any one message to inhibit future translation to said output circuit of information related to any other message sensed by said search means concurrently with said one message that said search means indicates is longer than said one message at the time of the sensed termination of said one message.

References Cited by the Examiner
UNITED STATES PATENTS 2,865,567 12/58 Booth et al. _____ 340—172.54
2,967,296 1/61 Chien et al. _____ 340—172.54

CHESTER L. JUSTUS, *Primary Examiner.*

LEWIS H. MYERS, KATHLEEN CLAFFY, FREDERICK M. STRADER, *Examiners.*